United States Patent
Freschl et al.

(10) Patent No.: US 9,811,444 B2
(45) Date of Patent: Nov. 7, 2017

(54) TESTING SOFTWARE ENHANCEMENTS IN DATABASE APPLICATIONS

(71) Applicant: salesforce.com, inc., San Francisco, CA (US)

(72) Inventors: Jeffrey Lallana Freschl, San Francisco, CA (US); Kiran Hariharan Nair, Dubin, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 166 days.

(21) Appl. No.: 14/817,550

(22) Filed: Aug. 4, 2015

(65) Prior Publication Data

US 2017/0039128 A1  Feb. 9, 2017

(51) Int. Cl.
*G06F 11/36* (2006.01)
*G06F 17/30* (2006.01)

(52) U.S. Cl.
CPC .... *G06F 11/3668* (2013.01); *G06F 17/30557* (2013.01); *G06F 11/3664* (2013.01); *G06F 17/30306* (2013.01)

(58) Field of Classification Search
CPC ............... G06F 17/30; G06F 17/30286; G06F 17/30289; G06F 17/30292–17/30309; G06F 17/30424; G06F 17/30427; G06F 17/30433–17/30439; G06F 11/3668; G06F 11/3672; G06F 11/368; G06F 11/3688; G06F 11/3692; G06F 11/34; G06F 11/3409; G06F 11/3414–11/3433; G06F 11/3003; G06F 11/3466; G06F 11/3495; G06F 11/3612; G06F 17/34; G06F 17/3409; G06F 17/3414–17/3433; G06F 17/3003; G06F 17/3466; G06F 17/3495; G06F 17/36; G06F 17/3612; G06F 17/3668; G06F 17/3672; G06F 17/368; G06F 17/3688; G06F 17/3692; G06F 11/36–11/3696; G06F 17/30557; G06F 17/30306

See application file for complete search history.

(56) References Cited

U.S. PATENT DOCUMENTS 5,577,188 A   11/1996   Zhu
5,608,872 A   3/1997   Schwartz et al.
(Continued)

*Primary Examiner* — Diem Cao
*Assistant Examiner* — Erika Kretzmer
(74) *Attorney, Agent, or Firm* — Schwabe Williamson & Wyatt

(57) ABSTRACT

A test system registers a series of tests that reference different software enhancements added to an application within a database system. The test system enables individual software enhancements referenced by the tests and then runs log lines through the application to produce test structured query language (SQL). The database system compares the test SQL with baseline SQL produced by the application without enabling the software enhancements. The database system executes the test SQL and captures performance metrics when the test SQL is different from the baseline SQL. Comparing SQL results avoids processing and capturing performance metrics for log lines not affected by the software enhancements. Incrementally running the log lines with one software enhancement enabled at a time also allows the test system to isolate the performance impact of individual software enhancements on the database system.

21 Claims, 10 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,058,425 B2 * | 6/2015 | Padmanabhan ....... G06F 11/368 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0306591 A1* | 12/2010 | Krishna ............ G06F 17/30474 714/35 |
| 2011/0218958 A1 | 9/2011 | Warshavsky |
| 2011/0247051 A1 | 10/2011 | Bulumulla et al. |
| 2012/0042218 A1 | 2/2012 | Cinarkaya |
| 2012/0173516 A1* | 7/2012 | Waas ................ G06F 17/30433 707/718 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jakobson et al. |
| 2015/0135168 A1* | 5/2015 | Padmanabhan ....... G06F 11/368 717/131 |

* cited by examiner

| FEATURE TESTED (352A) | TOTAL LOG LINES AFFECTED (352B) | TOTAL REGRESSED LOG LINES (352C) | TOTAL IMPROVED LOG LINES (352D) | AVERAGE DB GETS DIFF. (REGRESSED/ IMPROVED) (352E) | ROW COUNT DIFF. (352F) | AVERAGE DB GETS (CHANGED) (352G) | SUM OF DB GETS (REGRESSED /IMPROVED) (352H) |
|---|---|---|---|---|---|---|---|
| SHARING_20 | 367 | 105 | 217 | 61289/ −24497 | 0 | 10699 | 9193469/ −5266959 |
| SHARING_30 | 252 | 105 | 147 | 45642/ −4162 | 5 | 16590 | 4792433/ −611866 |
| INDEX_SCAN | 240 | 104 | 136 | 45205/ −20023 | 2 | 45205 | 4701423/ −2723157 |
| COST_FACTOR | 209 | 86 | 123 | 25459/ −4062 | 0 | 25459 | 2189516/ −495637 |

350

206 REPLAY AND CAPTURE SYSTEM 202

USER INTERFACE 210

TESTING SOFTWARE ENHANCEMENTS IN DATABASE APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to testing software enhancements in database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Database systems may include application software that converts user requests into structured query language (SQL). The SQL is then used for accessing client data. Software developers are continuously changing code in the application software to improve database performance.

Current techniques for testing these code changes is time consuming and minimally effective. For example, different software developers may each add multiple software enhancements to the same application software. Millions of lines of previously captured customer requests (log lines) are then used for testing the updated software. It is difficult to tell if the log lines actually tested the enhancements and there is no good way to determine which enhancements improve or regress database performance.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 6 shows an example user interface displaying performance metrics for tests applied to the software application.

FIG. 9 shows the user interface displaying structured query language (SQL) produced by different tests.

DETAILED DESCRIPTION

Figure 1A:
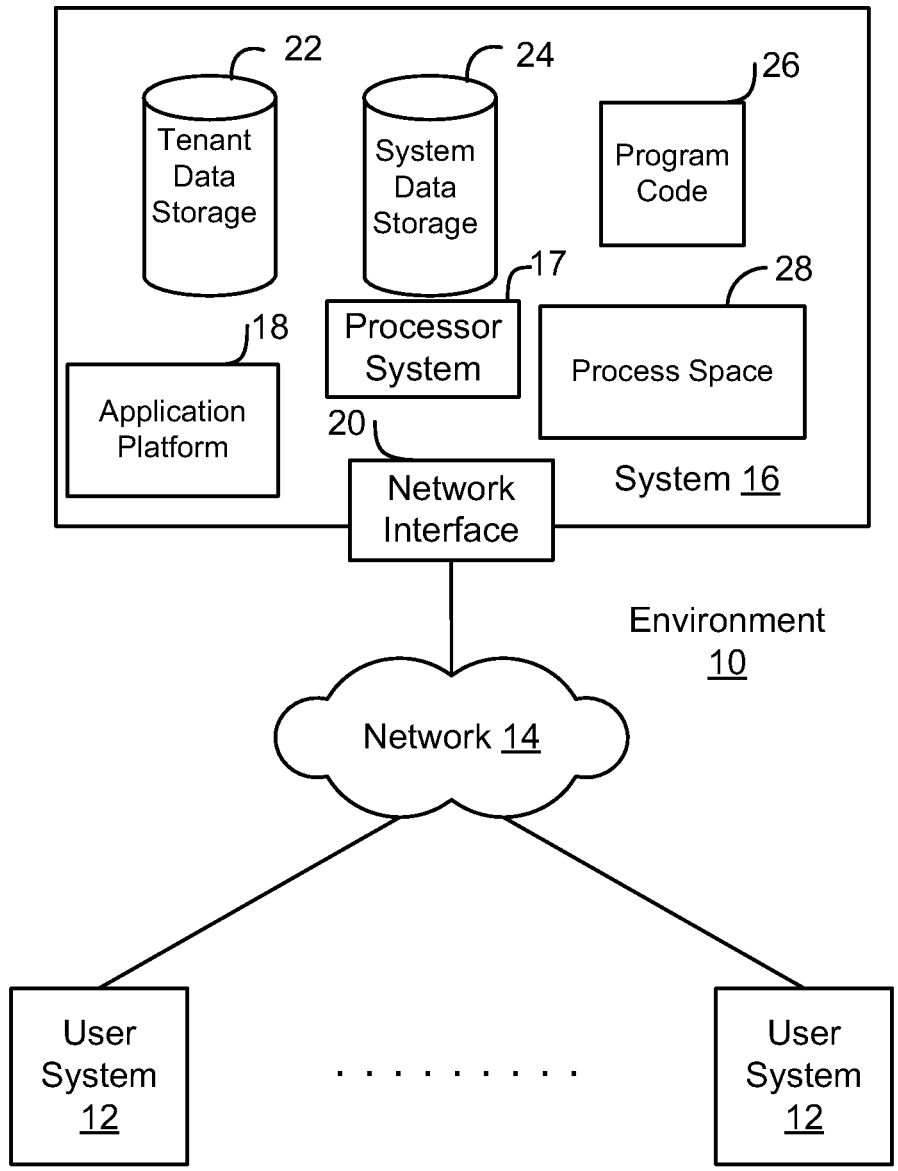
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B).

As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
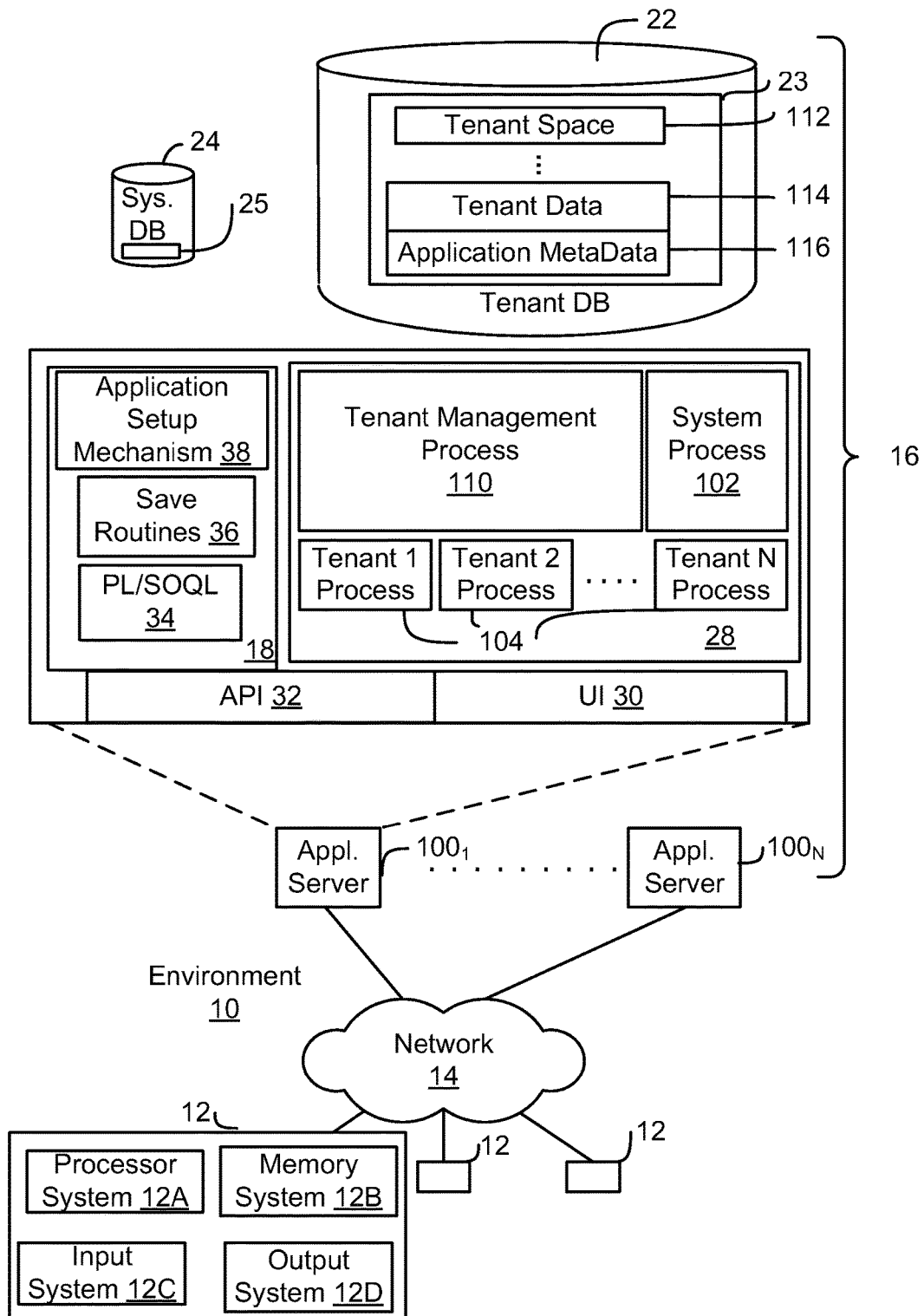
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Testing Software Enhancements in Database Applications

A test system registers a series of tests that reference different software enhancements added to an application within a database system. The test system enables individual software enhancements referenced by the tests and then runs log lines through the application to produce test structured query language (SQL). The database system compares the test SQL with baseline SQL produced by the application without enabling the software enhancements. The database system executes the test SQL and captures performance metrics when the test SQL is different from the baseline SQL.

Comparing SQL produced by the application avoids processing and capturing performance metrics for log lines not affected by the software enhancements. Incrementally running the log lines with one software enhancement enabled at a time also allows the test system to isolate the performance impact of individual software enhancements on the database system.

Figure 2:
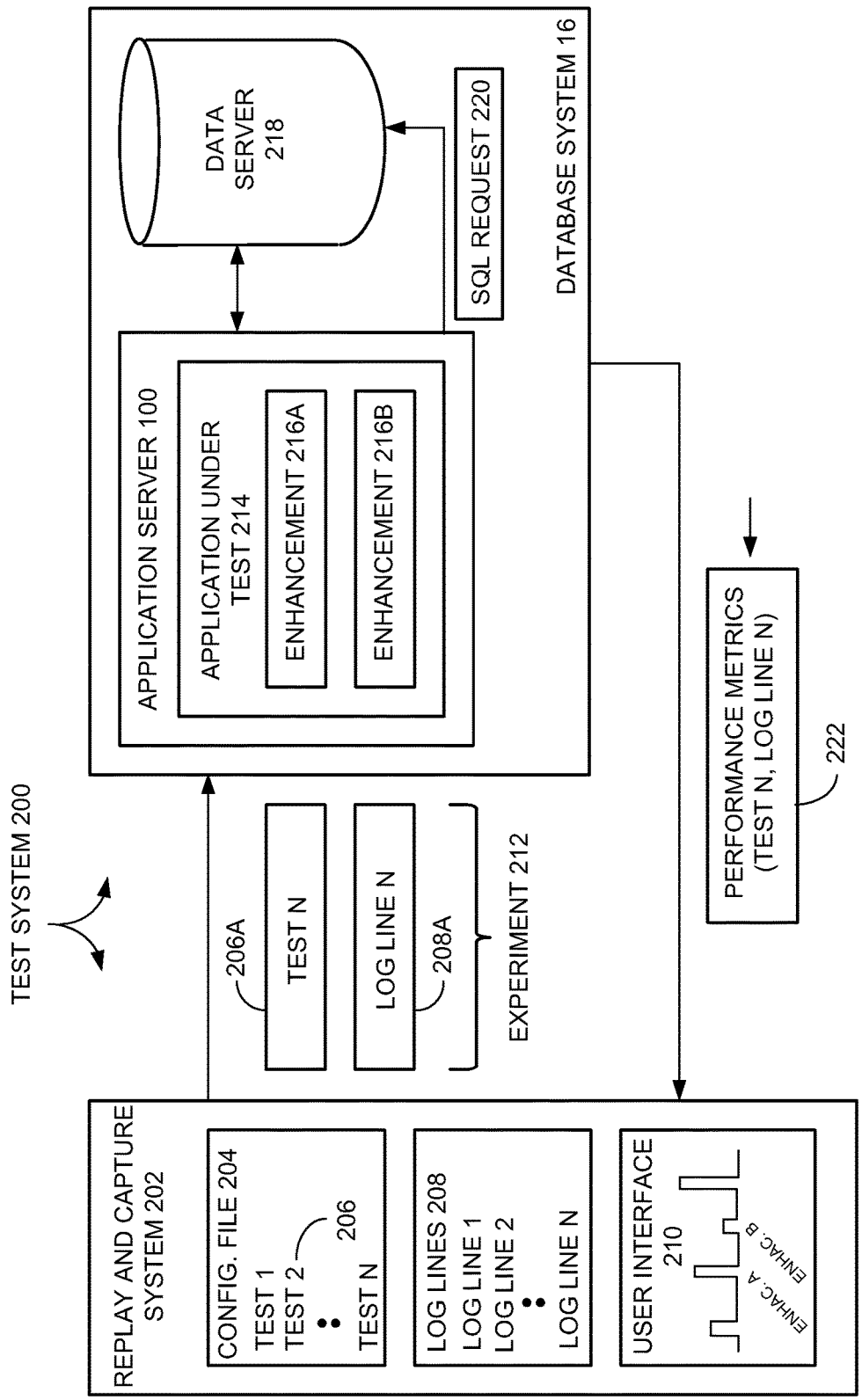
FIG. 2 shows an example test system for testing software enhancements in database applications.

FIG. 2 shows an example test system for testing software enhancements in database applications. Test system 200 may include a replay and capture system 202 and a database system 16 as described above. Replay and capture system 202 may include any computer configured to communicate with database system 16, such as user systems 12 described above in FIGS. 1A and 1B.

Replay and capture system 202 may store log lines 208 that in one example include user requests captured from prior network sessions with user systems. For example, log lines 208 may include requests to a software application in database system 16, such as a software as a service (SAAS) application, a customer relationship management (CRM) application, or any other cloud or database related application.

Application server 100 may include a software application 214 user test that is similar to the software application that previously received and responded to the user requests associated with log lines 208. However, application 214 may include software enhancements 216 that were not included in the previous version of application 214. For example, software developers may add software enhancements 216 to improve overall performance of database system 16 or to fix reported software bugs.

Replay and capture system 202 submits different experiments 212 to software application 214 that incrementally test software enhancements 216. For example, experiment 212 may include a log line 208A and a test 206A associated with one of software enhancements 216A. Application 214 runs log line 208A with software enhancement 216A enabled to produce a structured query language (SQL) request 220. For example, SQL request 220 may access data in data server 218.

Database system 16 may selectively execute and monitor different performance metrics 222 associated with SQL request 220. For example, performance metrics 222 may include central processor unit (CPU) usage by application server 100, processing time by database system 16, row counts, and/or the number of input/output (I/O) accesses between application 214 and data server 218.

Replay and capture system 202 may submit experiments 212 to application 214 that incrementally test different individual software enhancements 216 with a series of different log lines 208. Replay and capture system 202 accumulates performance metrics 222 associated with individual software enhancements 216 and displays the results on a user interface 210. The incremental testing of individual software enhancements 216 and tracking of associated performance metrics 222 enable software developers to determine the performance impact of individual software enhancements 216 on database system 16.

Figure 3:
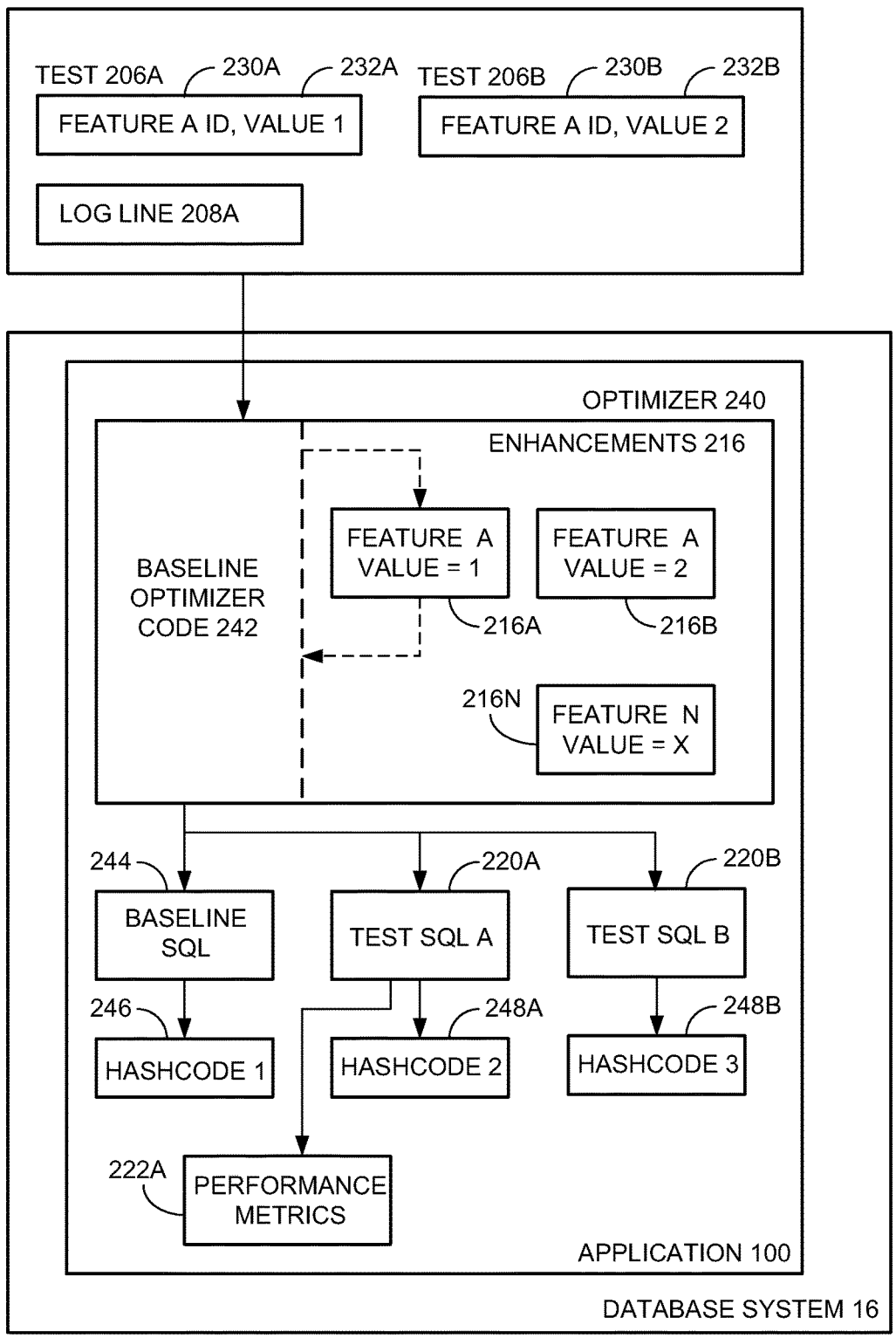
FIG. 3 shows the test system of FIG. 2 in more detail.

FIG. 3 shows the example test system of FIG. 2 in more detail. Application 100 in database system 16 may include an optimizer 240 that converts user requests captured as log lines 208 into SQL queries 220. Optimizer 240 may include baseline code 242 that does not include software enhancements 216. As mentioned above, software enhancements 216 may attempt to improve performance of database system 16 or resolve software bugs. For example, enhancement 216A may include code that uses a new indexing scheme for accessing customer records. While described with respect to optimizer 240, enhancements 216 could be associated with any feature in any software application.

Each software enhancement 216 may reference a particular feature and value. In this example, a first enhancement 216A references feature A and value 1. A second enhancement 216B references feature A and a value 2, and a third enhancement 216N references a feature N and a value X. Features may refer to a name used within an associated software enhancement 216 and values may refer to qualifiers used within enhancement 216.

Application 100 receives experiment 212 from the replay and capture system described above in FIG. 2. Experiment 212 may include one or more tests 206 and one or more log lines 208. For example, experiment 212 includes tests 206A and 206B and log line 208A. Tests 206 include identifiers 230 and values 232 associated with particular enhancements 216. For example, test 206A may include a feature identifier=A and value=1 associated with enhancement 216A and test 206B may include feature identifier=A and value=2 associated with enhancement 216B.

This is just one example and in another implementation experiment 212 may consist of one test and one log line. In another implementation experiment 212 may consist of one test and multiple log lines. Regardless of the configuration, any combination of application 100 and/or replay and capture system 202 may track progress of any portion and any combination of experiments 212.

Application 100 may initially run log line 208A through optimizer 240 without any associated test 206. For example, if a test 206 does not include a feature 230 and value 232, application 100 runs log line 208A through baseline optimizer code 242 and generates baseline SQL 244. Application 100 then may run log line 208A through optimizer 240 with test 206A. In this example, feature ID 230A and value 232A in test 206A causes optimizer 240 to pass log line 208A with enhancement 216A enabled and generate test SQL 220A.

Application 100 may generate a first hashcode 246 from baseline SQL 244 and generate a second hashcode 248A from test SQL 220A. If hashcodes 246 and 248A are the same, software enhancement 216A had no impact on log line 208A. Application 100 then cancels any further processing or testing of test SQL 220A and may send an associated redundant SQL message back to the replay and monitoring system.

In this example software enhancement 216A affected log line 208A and hashcodes 246 and 248A are not the same. Accordingly, application 100 executes test SQL 220A, monitors, and sends associated performance metrics 222A back to the replay and monitoring system.

Application 100 then runs log line 208A through optimizer 240 again with test 206B. In this example, test 206B references feature ID 230B and value 232B associated with enhancement 216B. Test 206B causes optimizer 240 to run logline 208A with enhancement 216B enabled and generate test SQL 220B.

Application 100 generates and compares hashcode 248B for test SQL 220B with baseline hashcode 246. In this example, hashcodes 248B and 246 are the same. Application 100 cancels further execution and monitoring for test SQL 220B and sends a message back to the replay and capture system indicating enhancement 216B did not affect logline 208A. Application 100 avoids generating performance metrics 222 for enhancements 216 that do not affect log lines 208. Application 100 can test more log lines 208 by avoiding unnecessary SQL testing for the redundant SQL results 220B.

Values 232 may specify different thresholds for enabling particular enhancements 216. For example, a software developer may want to test a new index threshold feature. Based on values 232, the enhancement 216 may use different indexes. For example, value 232A may be associated with an index value of 30%. Enhancement 216A may use a first index if less than 30% of the entries in a record are male and use a second index if more than 30% of the entries in the record are males.

A software developer can generate one set of experiments that use the same feature or enhancement with different values 232. Application 100 generates performance metrics 222 for each value 232. The test system then displays the different performance metrics 222 side-by-side indicating which values 232 provided the best results. Software developers also may use values 232 to test the stability of the system by introducing different states into database system 16 and confirming the same results.

Performance metrics 222 may include any data indicating the impact of enhancements 216 on database system 16. For example, performance metrics 222 may include, but are not limited to, processing times, a number of data I/O's, a number of rows or columns in tables or records, and/or types of data resulting from processing SQL 220.

After completing a series of tests 206 for a particular log line 208, application 100 may repeat the same series of tests 206 for a next log line 208. Application 100 then generates a second set of performance metrics 222 for the next log line 208. This incremental testing scheme enables software developers to test a series of software enhancements 216 and discover the impact of those enhancements against real production workloads.

Any device or software in database system 16 may receive experiments 212 from the replay and capture system and monitor the associated performance metrics. For example, a separate test application may operate within database system 16, communicate with the replay and capture system, and submit the tests 206 to application 100.

Figure 4:
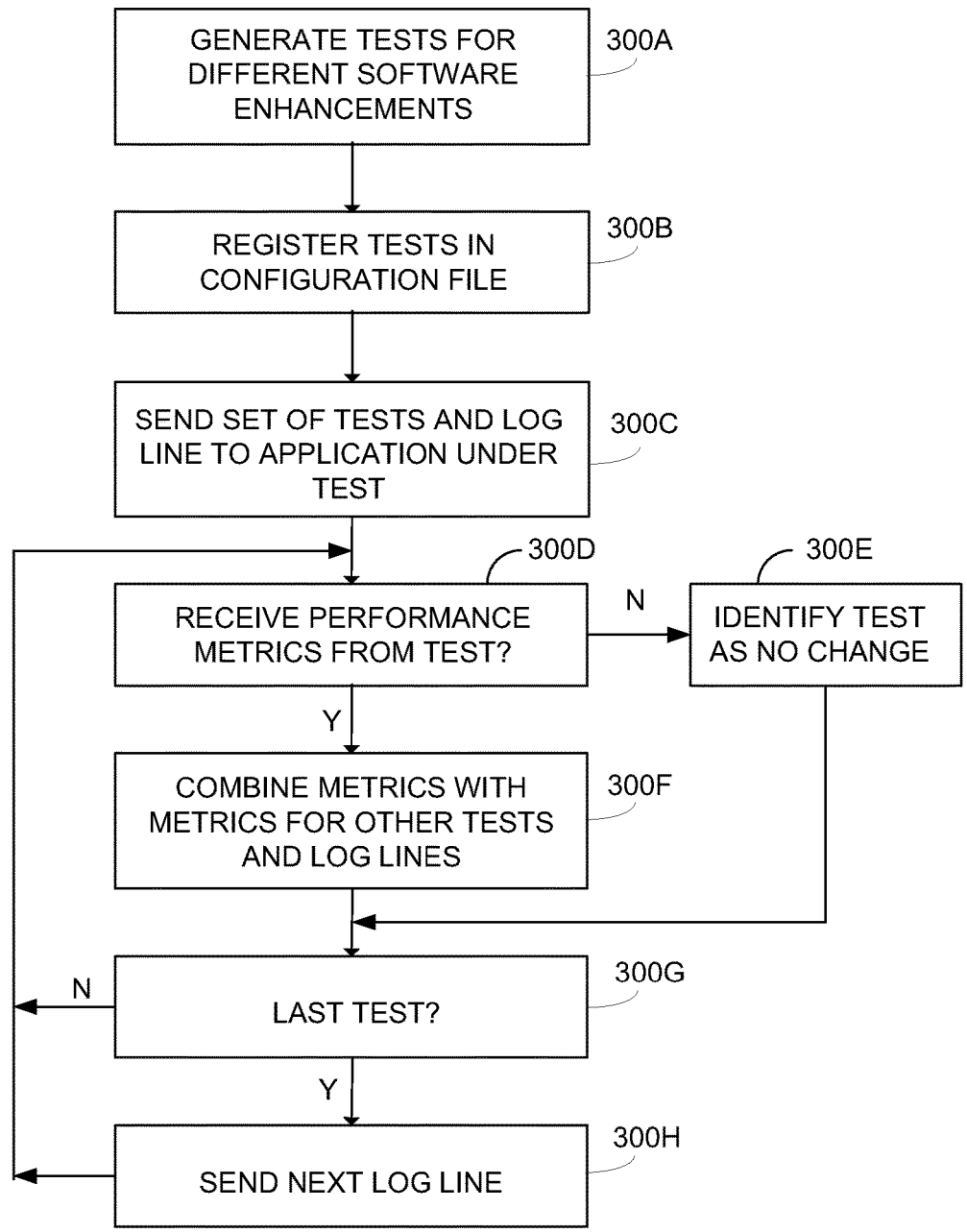
FIG. 4 shows an example process for submitting tests to a software application in a database system.

FIG. 4 shows an example process for submitting tests to a software application in a database system. In operation 300A, one or more software developers use the replay and capture system to generate tests for different software enhancements added to an application under test in the database system. In operation 300B, the software developers register their tests in a configuration file stored on the replay and capture system.

In operation 300C, the replay and capture system sends the tests in the configuration file along with a first log line to the application under test. In operation 300D, the replay and capture system monitors the database system for test results. For example, the replay and capture system may receive performance metrics for a particular test.

In operation 300F, the replay and capture system combines performance metrics for different tests. For example, the replay and capture system may calculate the total number of log lines affected by the same software enhancement and identify the number of those log lines with improved performance metrics and regressed performance metrics.

In operation 300D, the replay and capture system may receive a message or indication from the database system that performance metrics were not generated for the test. For example, the test may produce the same SQL as the baseline SQL. In operation 300E, the replay and capture system may add the no change information for the log line to the other performance metrics. For example, the replay and capture system may track the number of log lines affected and number of log lines unaffected by individual software enhancements.

In operation 300G, the replay and capture system continues to receive test results from the application. When the test results for the last test are received in operation 300G, the replay and capture system may send a next log line to the application for applying to the same set of tests.

FIG. 4 is just one example, and the replay and capture system may send any combination of tests and log lines to the database system. For example, the replay and capture system may send one test and one log line at a time. In another example, the replay and capture system may send multiple log lines and multiple tests to the application at the same time.

Figure 5:
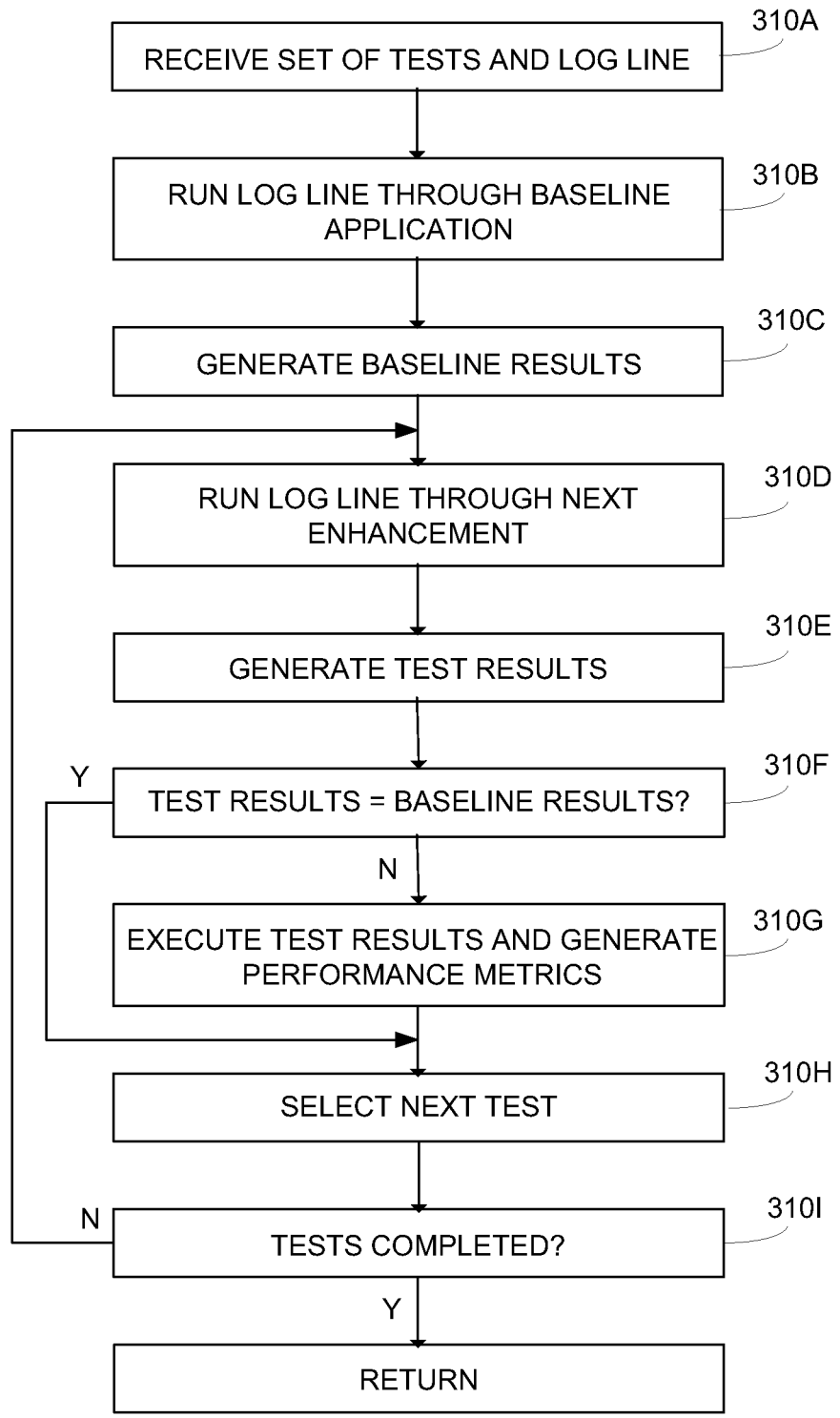
FIG. 5 shows an example process for incrementally testing different software enhancements in a software application.

FIG. 5 shows an example process for incrementally testing different software enhancements in a software application. In operation 310A, the application receives a set of tests and a log line from the replay and capture system. In operation 310B, the log line is run through the baseline application. For example, the application may run the log line through baseline optimizer code with no enhancements. In operation 310C, the application generates baseline results, such as a baseline SQL query generated by the baseline optimizer code.

In operation 310D, the application runs the log line with a first enhancement enabled. For example, the application runs the log line with a first enhancement enabled and that is associated with the feature identifier and value contained in a first one of the tests. In operation 310E, the application generates results for the log line using the identified test. For example, the application generates test SQL with the optimizer that uses the software enhancement associated with the test.

In operation 310F, the application determines if the test results match the baseline results. For example, the application may compare the test SQL with the baseline SQL. The application may send a "same results" message back to the replay and capture system when the test results match the baseline results in operation 310F.

In operation 310G, the application executes and generates performance metrics when the test results do not match the baseline results. For example, when the test SQL is different from the baseline SQL, the application may process the test SQL and monitor performance metrics. The application then sends the performance metrics back to the replay and capture system.

In operation 310H, the application selects a next test. If the set of tests are not completed in operation 310I, the application in operation 310D runs the same log line with the code enhancement enabled and that is associated with the next test. If the set of tests are completed in operation 310I, the application may send a message back to the replay and capture system requesting a next log line for applying to the set of tests.

FIG. 6 shows an example user interface displaying some performance metrics for the tests applied to the software application. Replay and capture system 202 may display a table 350 on user interface 210. Table 350 may include a first column 352A that lists different tests 206 performed with the application. As explained above, tests 206 enable or reference software enhancements in the software application under test.

A column 352B may identify a total number of log lines affected by specific tests 206. For example, column 352B may identify the number of log lines where the enhancement associated with the test produced test SQL different from the baseline SQL.

Column 352C identifies a total number of regressed log lines. For example, the performance metrics may identify the amount of time taken by the database system to process the test SQL associated with tests 206. If the processing time for the test SQL is greater than the processing time for the baseline SQL, system 202 identifies the log line as regressed in column 352C. If the processing time for the test SQL is less than the processing time for the baseline SQL, system 202 identifies the log line as improved in column 352D.

Column 352E identifies regressed and improved differences in an average number of database gets (DB gets). For example, the performance metrics may identify the number of data I/O operations for the baseline SQL. The performance metrics also may identify the number of data I/O operations performed by the test SQL for each log line applied to a same test 206. Test SQL with an increased number of DB gets is considered a regression and test SQL with a reduced number of DB gets is considered an improvement. For example, a reduction in the number of DB gets may correspond to fewer data accesses to slower disk memory in a disk server. Column 352E may identify the average difference in regressed and improved numbers of DB gets.

Column 352F may identify a row count difference between the baseline SQL and the test SQL. For example, column 352F may identify a row count for records, tables, and/or indexes created, modified, and/or accessed by the baseline SQL and the test SQL. Any difference in the row counts may indicate a possible error associated with test 206.

Replay and capture system 202 may calculate an average number of DB gets that changed between the baseline SQL and the test SQL for the set of tested log lines. Column 352H identifies a total number of database gets that regressed and improved from the baseline SQL. For example, replay and capture system 202 may calculate the total number of additional storage access operations (regressed) compared with the baseline SQL and the total number of reduced storage I/O operations (improved) compared with the baseline SQL.

Figure 7:
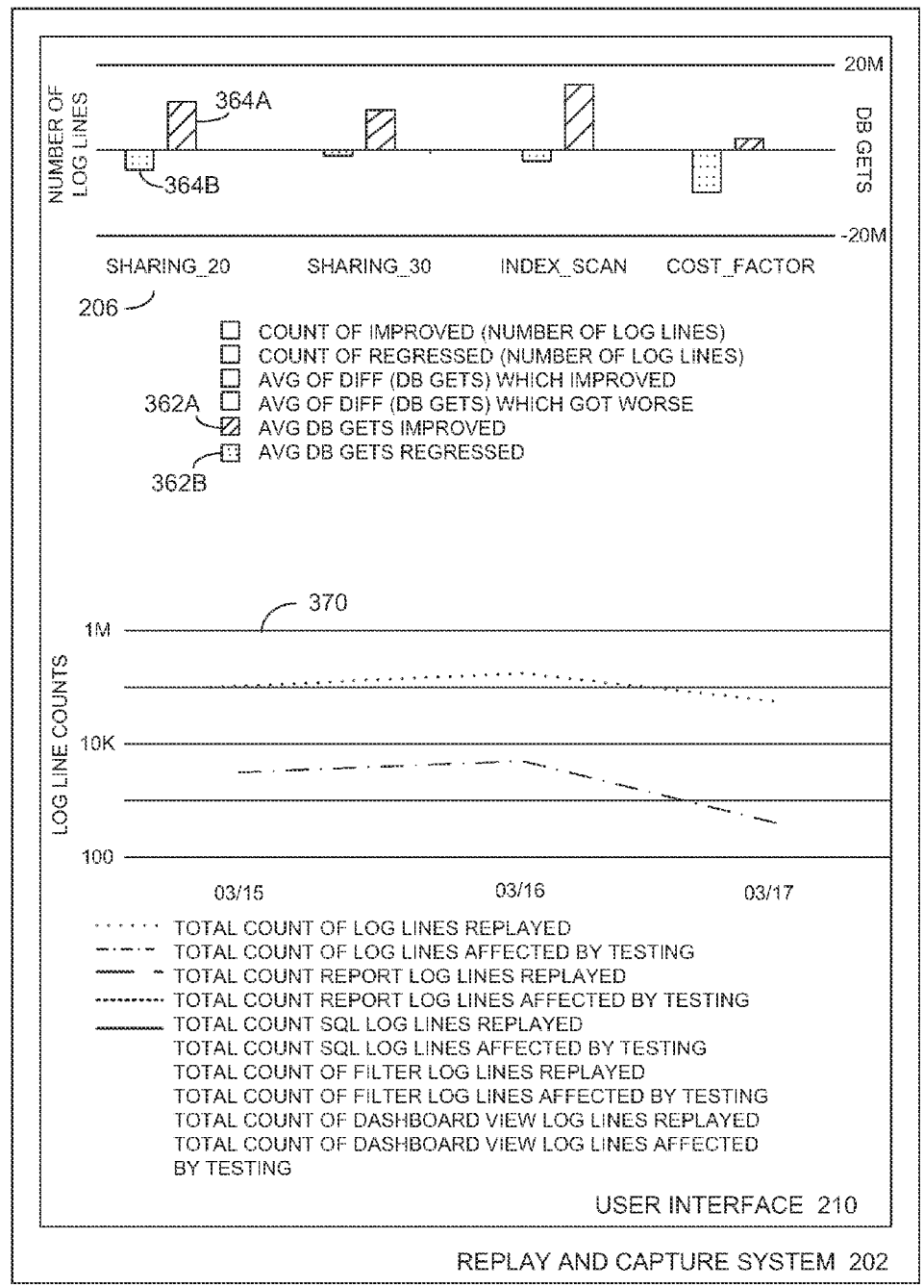
FIG. 7 shows the user interface of FIG. 6 displaying the performance metrics in different graphs.

FIG. 7 shows the user interface of FIG. 6 displaying the performance metrics in different graphs. Selecting any of blocks 362 cause user interface 210 to display histograms 364 for associated tests 206. For example, selecting blocks 362A and 362B cause user interface 210 to display histograms 364 for the average number of reduced DB gets in histogram 364A and average number of added DB gets in histogram 364B. Graph 370 shows different log line counts, such as for a total number of replayed log lines for a particular day, total log lines affected by the tests, etc.

Figure 8:
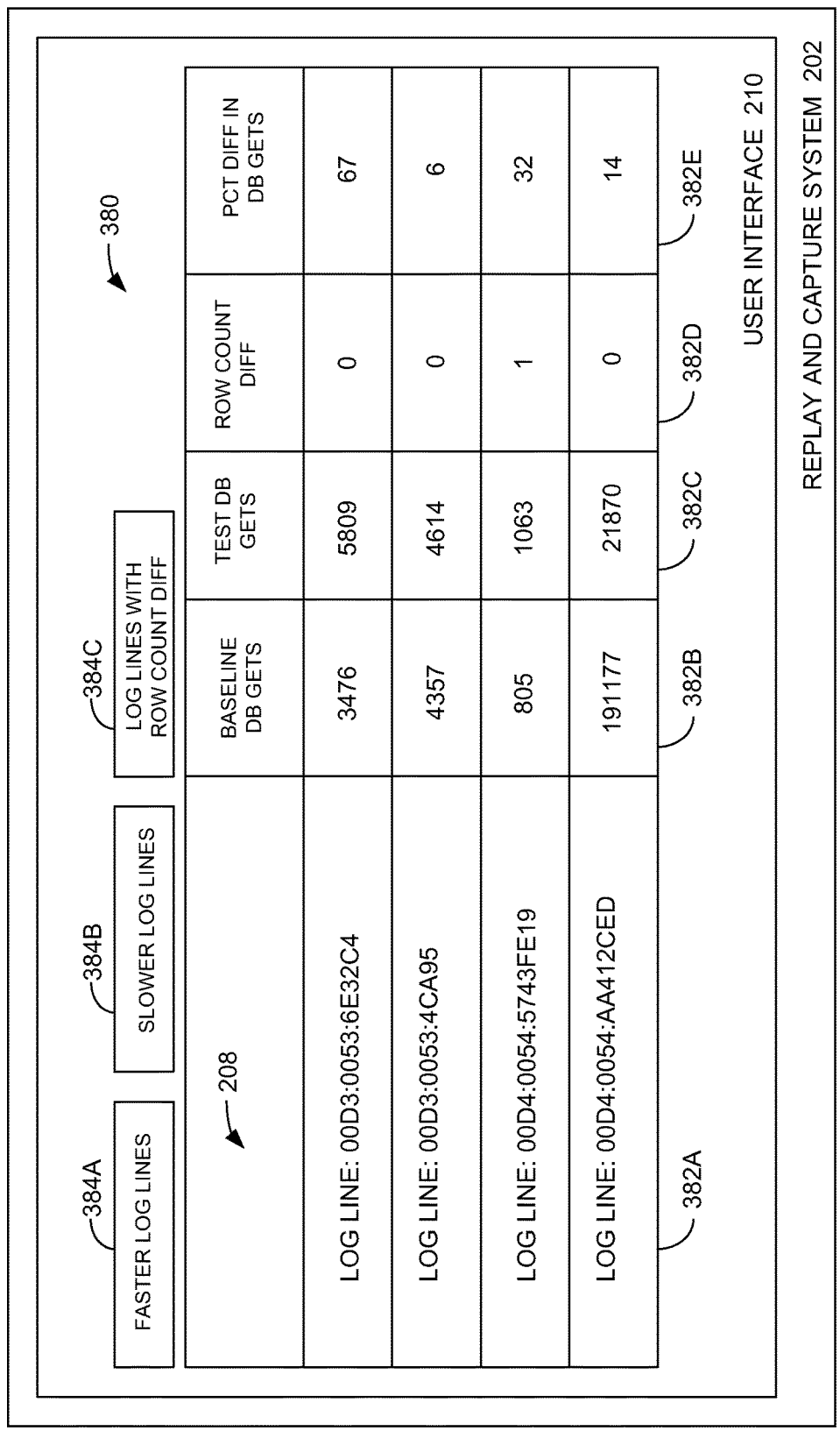
FIG. 8 shows the user interface displaying performance metrics produced by different log lines.

FIG. 8 shows the user interface displaying performance metrics produced by different log lines. A table 380 in column 382A identifies different log lines 208 applied to a particular test. For example, column 382A identifies log lines 208 processed with a particular software enhancement enabled in a software optimizer. A column 382B identifies a number of DB gets for the baseline SQL produced from log lines 208. Column 382C identifies the number of DB gets for the test SQL produced from log lines 208. A column 383D identifies row count differences between the baseline SQL and the test SQL generated from log lines 208.

A column 382E identifies a percentage difference between the DB gets produced by the baseline SQL and the test SQL. A user may click on column 382E to sort log lines 208 from highest to lowest percentage difference in DB gets between the baseline SQL and the test SQL. This enables the user to view the largest regressions caused by enhancements applied to log lines 208.

A user may select a tab 384A to display the faster log lines. For example, tab 384A may display the faster log lines 208 that improved and took less time to process by the database system. A user may select a tab 384B to display the slower log lines that regressed and took longer to process by the database system. A user may select a tab 384C to display log lines that produce a different row count than the baseline SQL. As mentioned above, a user may select tab 384B to identify enhancements that may create errors or other problems in the database system.

Figure 9:
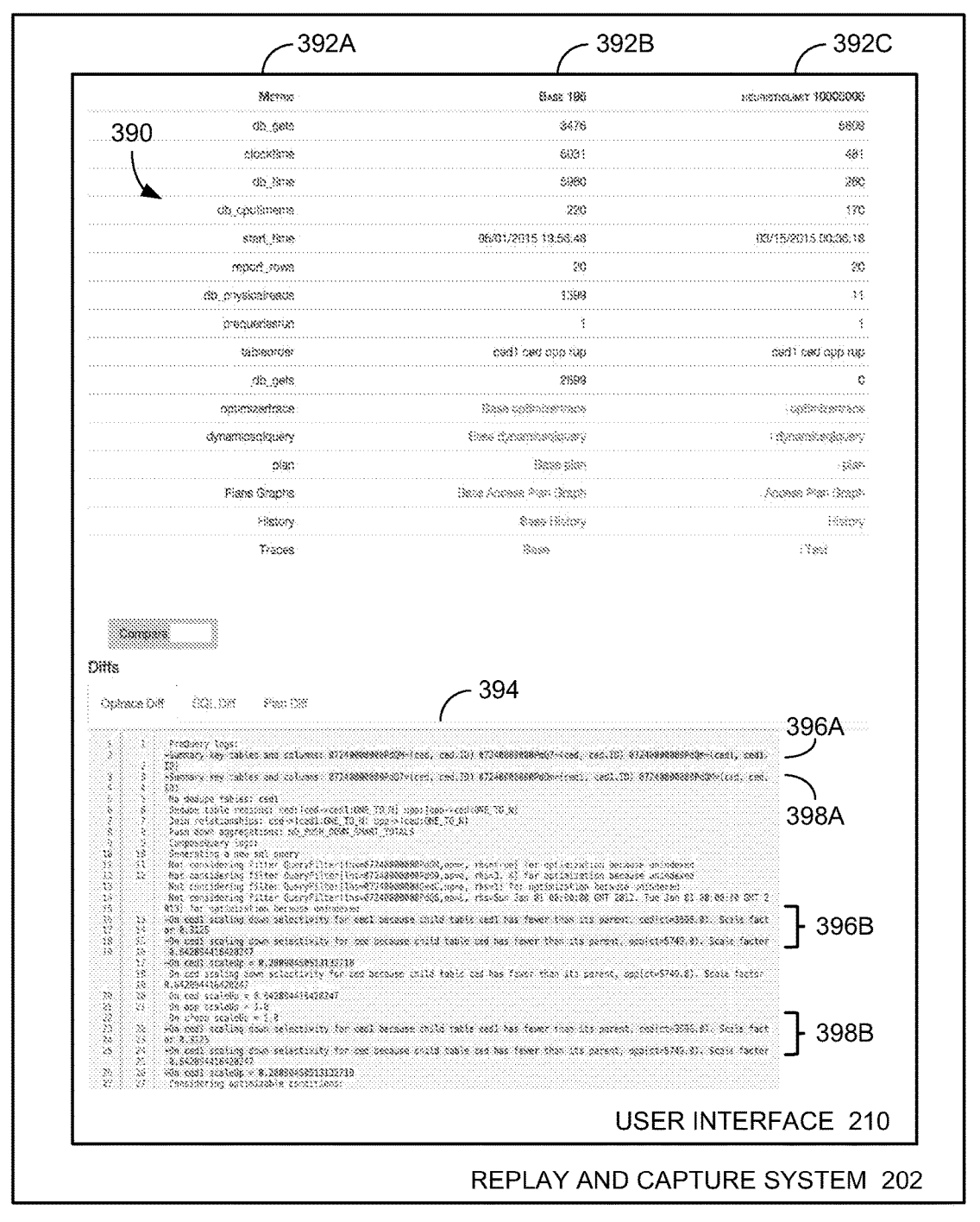

FIG. 9 shows the user interface displaying structured query language (SQL) produced by different tests. User interface 210 may display a table 390 in response to a user selecting one of the log lines in FIG. 8. Table 390 may include a column of names 392A for different performance metrics. A second column in table 390 may identify performance metrics 392B for the baseline SQL. A third column may display the corresponding performance metrics 392C for the selected log line.

User interface 210 also may display SQL in page 394. User interface 210 may display baseline SQL 396 and display any differences between baseline SQL 396 and test SQL 398. For example, user interface 210 may highlight a section 396A of baseline SQL and highlight in a different color the corresponding differences 398A in the test SQL. User interface 210 highlights a second section 396B in the baseline SQL and highlights corresponding differences 398B in the test SQL.

User interface 210 enable software developers to drill down into specific log lines and the SQL access plan created for those log lines by enhancements in the software optimizer. The performance metrics displayed in FIGS. 6-9 are particularly useful for comparing experiments. For example, a software developer may create an experiment that tests different values or tests an internal limit or threshold. The software developer may view the series of test results side-by-side to identify which enhancements produce the best performance metrics with the least impact on the software application.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method of testing enhancements for application code operating in a database system, the method comprising the steps of:
  receiving, by the database system, from a replay and capture system, a series of tests referencing the enhancements, each of the tests referencing a feature and a distinct value;
  receiving, by the database system, two or more log lines from the replay and capture system, each of the log lines describing a user request captured during a prior network session between a user system and the database system;
  running, by the database system, a first log line through the application code without the enhancements to produce baseline structured query language (SQL); and incrementally testing the application code by, for each of the series of tests:
running, by the database system, the first log line with the enhancement enabled in the application code with the feature and value referenced by the test to produce test SQL;
comparing, by the database system, the test SQL with the baseline SQL;
when the comparison indicates a no change between the baseline SQL and the test SQL, not executing the test SQL; and
when the comparison indicates a change between the baseline SQL and the test SQL, executing, by the database system, the test SQL and capturing performance metrics for the executed test SQL; and
running a next one of the series of tests with the enhancement enabled with a corresponding feature and value of the next test; and
repeating the foregoing testing steps until the series of tests is completed.

2. The method of claim 1, wherein the step of comparing the test SQL with the baseline SQL includes:
generating, by the database system, a first hash code from the baseline SQL;
generating, by the database system, second hash code for the test SQL; and
comparing the first hash code with the second hash code to detect a change between the baseline SQL and the test SQL.

3. The method of claim 1, further comprising:
running, by the database system, the same tests with at least one more of the received log lines; and
combining, by the database system, the performance metrics for the same tests for the received log lines that were used in running the same tests.

4. The method of claim 1, further comprising:
creating, by the database system, the enhancements in a SQL code optimizer for the application code; and
running, by the database system, the tests through the SQL code optimizer.

5. The method of claim 1, further comprising: monitoring, by the database system, baseline times for processing the baseline SQL; and monitoring, by the database system, test times for processing the test SQL.

6. The method of claim 1, further comprising: monitoring, by the database system, a number of baseline input/output (I/O) operations performed for the baseline SQL; and monitoring, by the database system, a number of test I/O operations performed for the test SQL.

7. The method of claim 1, further comprising: monitoring, by the database system, row counts produced by the baseline SQL; and monitoring, by the database system, row counts produced by the test SQL.

8. The method of claim 1, wherein the application code is one of a software as a service (SAAS) application, a customer relationship management (CRM) application, or a database application.

9. The method of claim 1, wherein when the comparison indicates that the test SQL is the same as the baseline SQL, additionally sending a same-results message back to the replay and capture system.

10. A computing device for testing code features in an application operated in a database system, comprising:
a processor; storage memory; and one or more stored sequences of instructions which, when executed by the processor, cause the processor to carry out the steps of:
storing a series of tests referencing the code features in the application, each of the tests referencing a feature and a distinct value;
storing a set of log lines, each of the log lines describing a user request captured during a prior network session between a user system and the database system;
running, by the database system, the log lines without the features enabled in the application to produce baseline SQL;
submitting the tests and the log lines to the database system for incrementally testing the code features referenced by the tests, by, for each of the series of tests:
running, by the database system, one log line of the log lines with the enhancement enabled in the application with the feature and value referenced by the test to produce test SQL;
comparing, by the database system, the test SQL with the respective baseline SQL generated for the one log line;
when the comparison indicates a no change between the baseline SQL and the test SQL, not executing the test SQL; and
when the comparison indicates a change between the baseline SQL and the test SQL, executing, by the database system, the test SQL and capturing performance metrics for the executed test SQL; and
running a next one of the series of tests, with the enhancement enabled with a corresponding feature and value of the next test; and
repeating the foregoing testing steps until the series of tests is completed;
receiving performance metrics from the database system associated with the different code features; and
displaying the performance metrics for the different code features on a user interface.

11. The computing device of claim 10, wherein the instructions further cause the processor to carry out the steps of: receiving a first set of the performance metrics from the database system for the log lines run through the application without using the code features; receiving a second set of the performance metrics from the database system for the log lines run with individual code features enabled in the application; and comparing the first set of performance metrics with the second set of performance metrics.

12. The computing device of claim 10, wherein the instructions further cause the processor to carry out the steps of:
submitting a first set of the tests to an optimizer in the database system causing the optimizer to generate baseline structured query language (SQL) without using the code features; and submitting a second set of the tests to the optimizer causing the optimizer to use the code features to generate test SQL.

13. The computing device of claim 12, wherein the database system does not generate the performance metrics for the test SQL that matches the baseline SQL.

14. The computing device of claim 12, wherein the instructions further cause the processor to display the baseline SQL and highlight portions of the test SQL that are different from the baseline SQL.

15. The computing device of claim 10, wherein the instructions further cause the processor to carry out the steps of identifying from the performance metrics a first number of the log lines run through each of the code features with improved database processing times and a second number of the log lines with regressed database processing times.

16. The computing device of claim 10, wherein the instructions further cause the processor to carry out the steps of identifying from the performance metrics a number of database gets for the log lines processed by each of the code features.

17. The computing device of claim 16, wherein the instructions further cause the processor to carry out the steps of comparing the number of database gets for the log lines using the code features with the number of database gets for the log lines not using the code features.

18. The computing device of claim 10, wherein the instructions further cause the processor to carry out the steps of comparing row counts produced by the database system using the code features and row counts produced by the database system without using the code features.

19. A non-transitory computer-readable medium that stores a computer program for a database system, the computer program comprising a set of instructions operable, when executed by a computer processor, to:
  receive a series of tests referencing software features added to an application in the database system, each of the tests referencing a feature and a distinct value;
  receive a series of log lines, each of the log lines describing a user request captured during a prior network session between a user system and the database system;
  run the log lines through the application without enabling the software features to produce baseline structured query language (SQL);
  incrementally testing the application by, for each of the series of tests:
  run the log lines with individual software features enabled with the feature and value referenced by the tests to produce test SQL;
  compare the test SQL with the baseline SQL;
  when the comparison indicates a no change between the baseline SQL and the test SQL, not executing the test SQL;
  when the comparison indicates a change between the baseline SQL and the test SQL,
  execute the test SQL with the database system and capture performance metrics for the executed test SQL;
  running a next one of the series of tests, with the enhancement enabled with a corresponding feature and value of the next test; and
  repeating the foregoing testing steps until the series of tests is completed.

20. The computer program of claim 19, wherein instructions to compare the test SQL with the baseline SQL includes instructions to:
  generate a first hash code from the baseline SQL;
  generate second hash codes from the test SQL; and
  compare the first hash code with the second hash code to detect a change between the baseline SQL and the test.

21. The computer program of claim 19, including instructions operable to:
  monitor differences between the performance metrics for the same log lines run with different software features enabled with the feature and value referenced by different tests;
  run different log lines with the same software features enabled; and
  monitor differences between the performance metrics for the different log lines run with the same software features enabled.

* * * * *